Patented Jan. 6, 1942

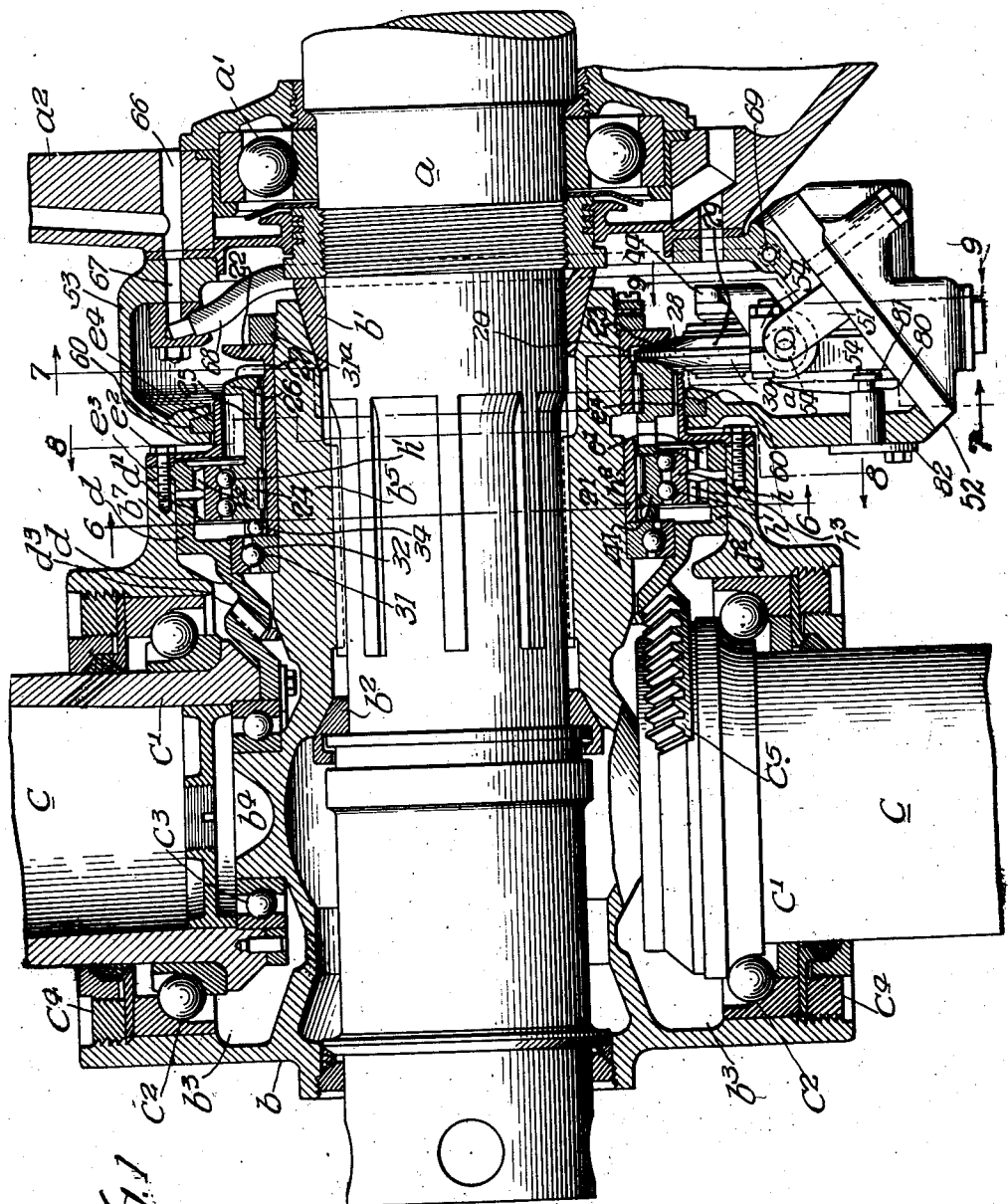

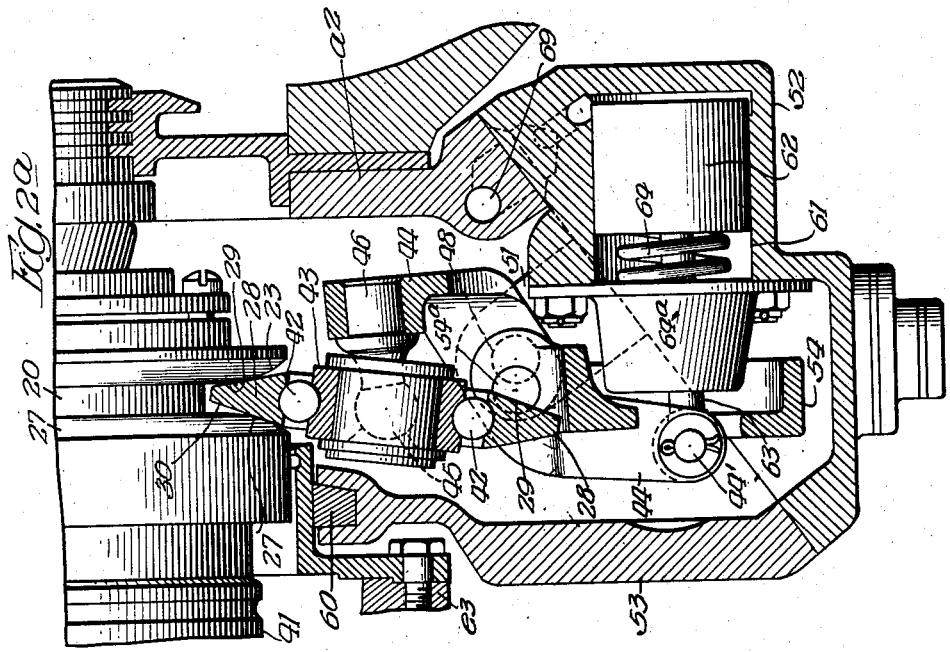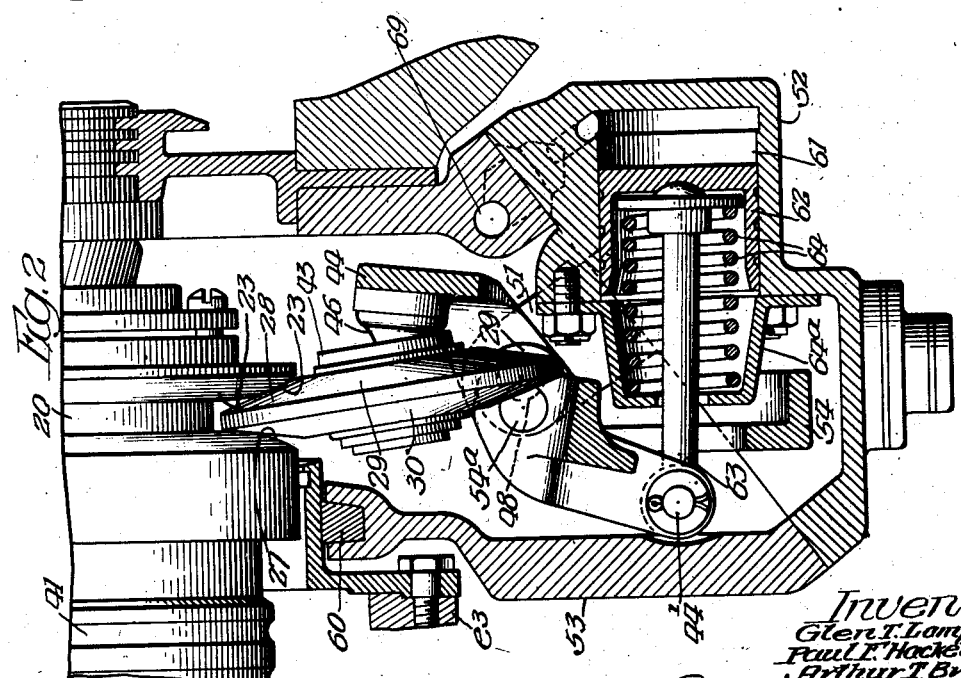

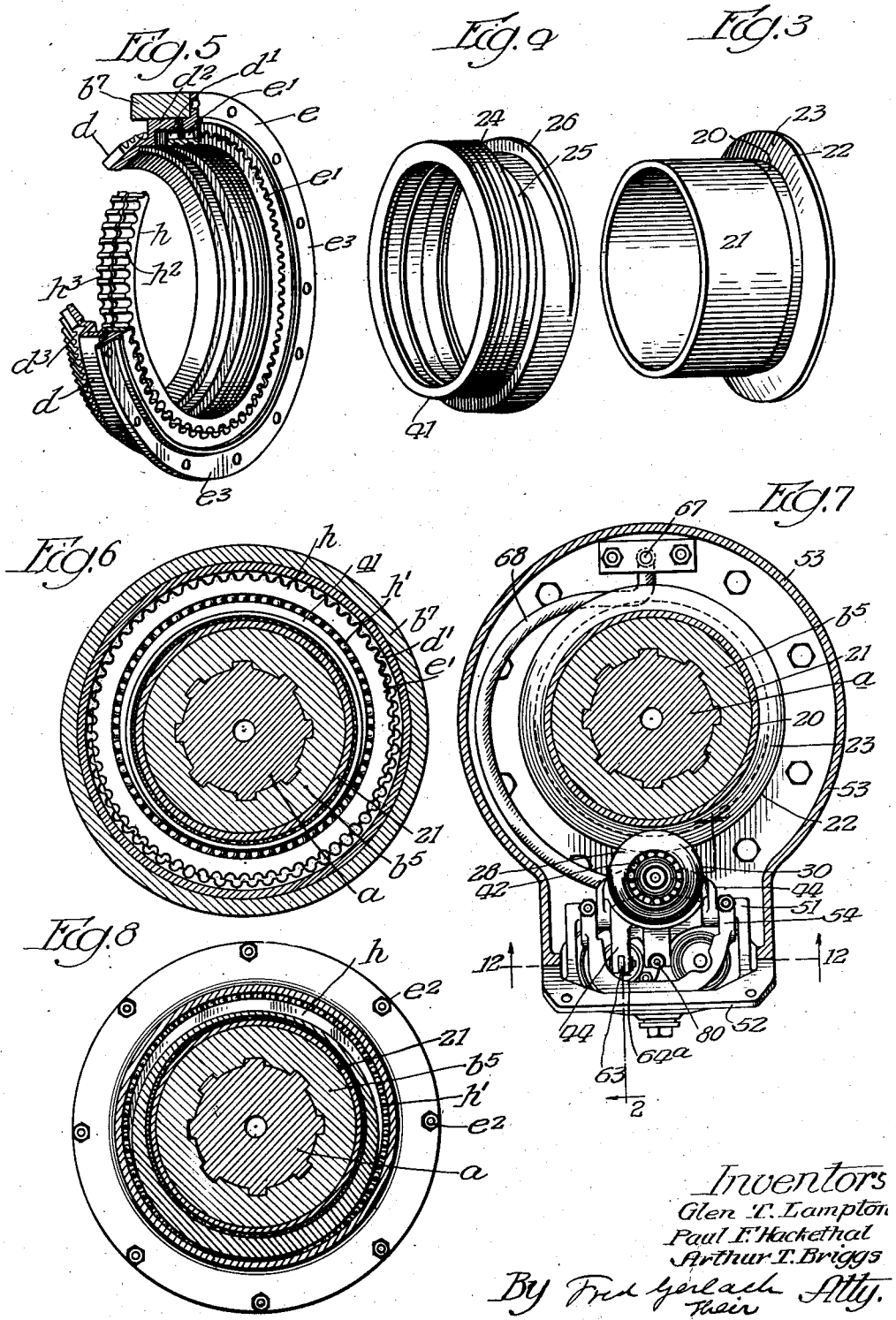

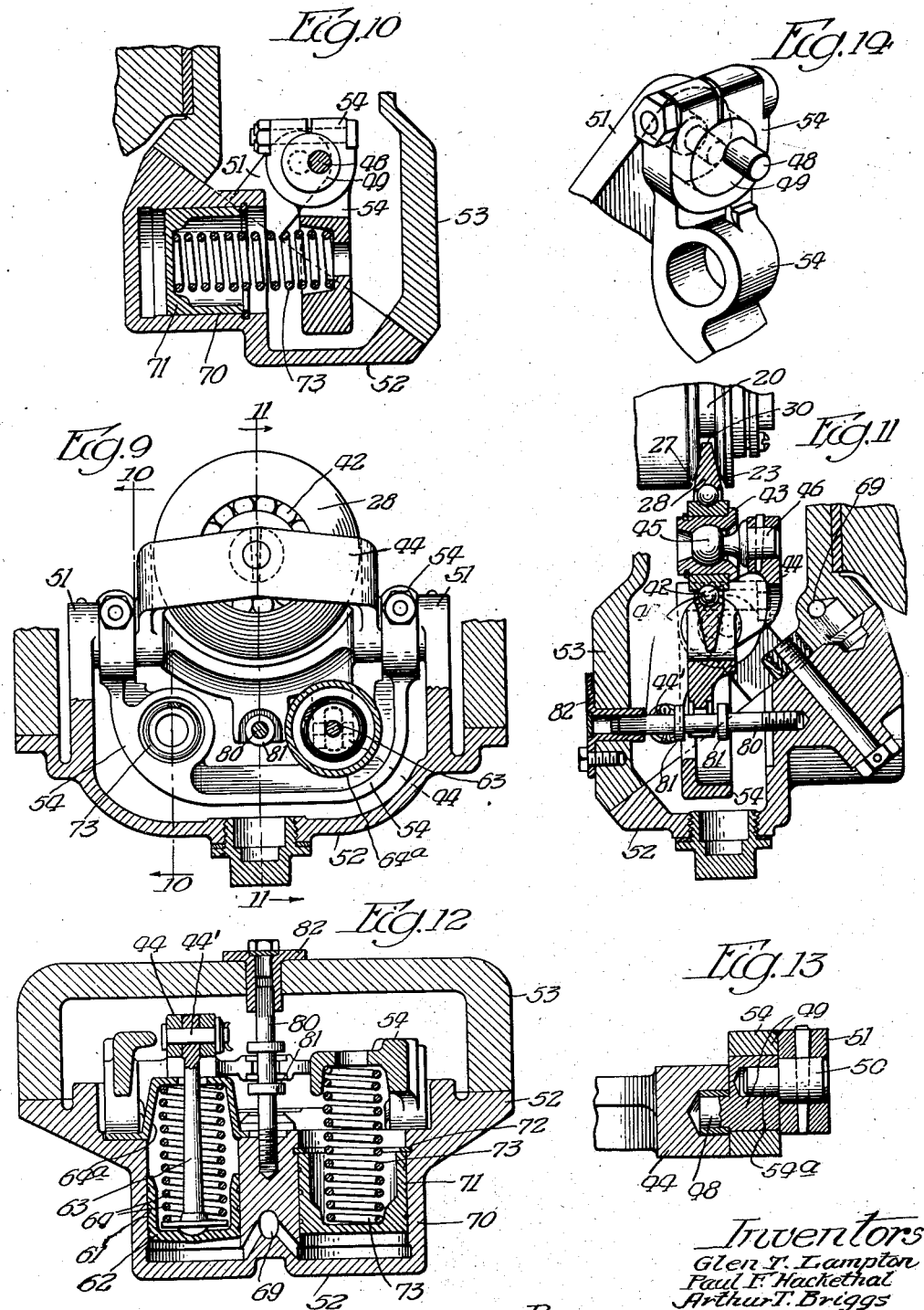

2,268,948

UNITED STATES PATENT OFFICE 2,268,948

CONTROLLABLE PITCH PROPELLER

Glen T. Lampton, Paul F. Hackethal, and Arthur T. Briggs, Williamsport, Pa., assignors to Aviation Manufacturing Corporation, Williamsport, Pa., a corporation of Delaware Application June 7, 1937, Serial No. 146,822

12 Claims. (Cl. 170—163)

The invention relates to variable pitch propellers for airplanes.

One object of the invention is to provide improved, efficient and simple mechanism for effecting pitch-changes of the propeller blade by power derived from the propeller or propeller-shaft.

Another object of the invention is to provide improved pitch-change gearing which includes a very high-ratio speed reduction to minimize the power required for operating the pitch-change gearing.

Other objects of the invention will appear from the detailed description.

The invention consists in the several novel features which are hereinafter set forth and are more particularly defined by claims at the conclusion hereof.

In the drawings: Fig. 1 is a longitudinal section of a propeller embodying the invention. Fig. 2 is a section on line 2—2 of Fig. 9 illustrating the pivoted friction-pulley set for driving the pitch-change gearing to increase the pitch of the blades. Fig. 2$^a$ is a similar view illustrating the friction-pulley set for decreasing the pitch of the blades. Fig. 3 is a perspective of a friction driving element which is fixed on and rotates with the propeller hub. Fig. 4 is a perspective of the driven friction-element which is rotatable around the driving-element. Fig. 5 is a sectional perspective of the gearing between the friction-driven element and the gear-segments on the propeller-blades. Fig. 6 is a transverse section on line 6—6 of Fig. 1. Fig. 7 is a section on line 7—7 of Fig. 1. Fig. 8 is a section on line 8—8 of Fig. 1. Fig. 9 is a rear elevation of the variable friction-pulley and its mounting. Fig. 10 is a section on line 10—10 of Fig. 9. Fig. 11 is a section on line 11—11 of Fig. 9. Fig. 12 is a section on line 12—12 of Fig. 1. Fig. 13 is a detail section of the pivotal mounting for the shifter yokes for the friction-pulley. Fig. 14 is a detail perspective of the pivotal mounting for the yokes for shifting the friction-pulley.

The invention is exemplified in an airplane propeller comprising an engine-driven shaft $a$, a hub $b$ keyed to the shaft between wedge-collar $b^1$, $b^2$ and provided with radial sockets $b^3$ and propeller blades $c$ provided with shanks $c^1$ which are supported in ball bearings $c^2$, $c^3$ in the sockets $b^3$. Shaft $a$, which may be the engine shaft, is journaled in a ball bearing $a^1$ carried by a stationary housing $a^2$ which may be a part of the engine casing. The outer races of bearings $c^2$ are held in sockets $b^3$ by outward thrust-members $c^4$ and the inner races of bearings $c^3$ are secured on studs $b^4$ which are integral with the hub $b$.

A bevel-gear segment $c^5$ is adjustably fixed to the inner end of each blade shank $c^1$. A gear-ring $d$ with external bevel-teeth $d^3$ is rotatable in the hub and relatively to the hub $b$ and shaft $a$. Said teeth mesh with segments $c^5$ on all of the propeller-blades to equidistantly and oppositely rotate the blades in the hub for pitch-variation. Gear-ring $d$ is journaled on ball bearing 31 which is carried by the hub portion $b^5$ within an extension $b^7$ of the hub. An internal series of gear teeth $d^1$ are provided in a flange $d^2$ at the inner end of gear-ring $d$. A gear-ring $e$ provided with internal gear-teeth $e^1$ corresponding to those on gear-ring $d$ is fixedly held in the hub $b$ by means of bolts $e^2$ which pass through a flange $e^3$ integral with ring $e$ and a head $e^4$ at the inner end of the hub portion $b^7$.

The improved gearing for varying the pitch of the blades by power derived from the propeller-shaft $a$ comprises: a friction driving element 20 which is provided with an integral hub or sleeve 21 which surrounds the hub portion $b^5$ and is keyed to rotate with the hub $b$ which rotates with shaft $a$, and with a radial flange 22 having an annular convex driving face 23 on one of its side faces; a complementary friction driven element 24 which is provided with a sleeve or hub 25 journaled on and rotatable around hub 21 of driving element 20 and with an integral radial flange 26 having an annular convex friction-face 27 opposite and spaced from the friction-face 23 of the driving element 20; and a friction-pulley or ring 28 which has conoidal friction-faces 29 and 30 on its opposite sides which engage, respectively, the convex driving face 23 and the driven face 27 to drive element 24 from element 20. This pulley or ring is pivotally mounted, as hereinafter described, so it can be positioned to increase or decrease the speed of the driven element 24 relatively to the driving element 20, the shaft $a$ and hub $b$, which rotate together, by engaging the pulley with the driving face 23 and the driven face 27 at relatively different radii. Driving element 20 is confined against longitudinal movement on hub portion $b^5$ between a collar 31$^a$ on hub $b$ and the inner race 32 which is secured on the hub. A ball bearing 34 is interposed between the outer end of hub 25 of driving element 24 and race 32 to receive the forward thrust on said element and the pulley or ring 28 confines said element against opposite longitudinal movement.

The driven element 24 is provided adjacent its front end with an integral eccentric 41 on its outer periphery. A gear-ring $h$ is journaled on and concentric with the eccentric 41 by means of ball bearings $h^1$. Ring $h$ is provided with a series of external teeth $h^2$ for meshing with the internal teeth $e^1$ of the ring $e$ which is fixed in the hub $b$ and with a corresponding series of teeth $h^3$ meshing with the teeth $d^1$ of the gear-ring $d$ which is rotatable in the hub to rotate the blades for pitch-changes. The external teeth $h^2$ and $h^3$ on ring $h$ are at least one less in number than the internal teeth on rings $d$ and $e$ and all of the teeth $h^2$, $h^3$, $d^1$, $e^1$ are of the type adapted for rolling contact as a result of the bodily rotation of the eccentric 41 and the rolling of the ring $h$ around said eccentric. Each rotation of the eccentric 41 in the hub causes the teeth $h^3$ of the ring $h$ to traverse the internal teeth $e^1$ on the ring $e$ which is fixed to the hub $b$ and, by reason of the lesser number of teeth $h^3$ on the eccentric-ring $h$, the latter will rotate in the hub and gear-ring $e^1$ a distance corresponding to one tooth if that is the difference in the number of the teeth between $h^3$ and $e^1$. Teeth $h^2$ and $h^3$ interfit with the teeth $d^1$ of the ring $d$ and teeth $e^1$ of ring $e$ at the point of maximum eccentricity of the ring and clear at the points of minimum eccentricity. Rotation of the eccentric 41 will cause the fixed ring $e$ and its teeth $e^2$, which mesh with teeth $h^2$, to rotate the eccentric ring $h$ in the hub, a distance corresponding to the gear-tooth, for each rotation of the eccentric 41 in or relatively to the hub, assuming the differential to be one more tooth in the rings $e$ and $d$ than in the ring $h$. This rotation of gear-ring $h$ in the hub will rotate gear-ring $d$ with it. Ring $d$ will rotate segments $c^5$ to rotate the blades on their own axes for pitch-variation. When the element 24 and eccentric 41 rotate with the hub and not relatively thereto, the pitch-change gearing will remain inactive to keep the blades at their set pitch. The driven element 24 is provided with an integral counter-balance 25$^a$ to balance the mass of element 24 which carries the eccentric 41.

The friction-faces 23, 27 are outwardly divergent and the friction-faces of pulley 28 are convergent to permit the pulley to be angularly adjusted while both of its faces remain in driving contact with faces 23, 27. Normally, that is when no pitch-change is desired, the axis of pulley 28 is parallel to the axis of shaft $a$, the lines of contact on driving and driven faces 23, 27 are of equal radii or equidistant from the axis of shaft $a$ and the lines of contact on pulley-faces 20, 30 are of equal radii or equidistant from the axis of the pulley, and the pulley will be neutral and rotate idly without producing any relative rotation between the driving and driven elements 20, 24. Elements 20, 24 will rotate with the hub and shaft $a$ and pulley 28 will rotate on its own axis, and hub $b$ without effecting any relative movement between said elements and, in consequence, the pitch-change gearing will remain ineffective or without pitch-changing movement. The gear-rings $d$, $e$, $h$ will all rotate with the hub $b$ and shaft $a$ without operating the pitch-change gearing, so that the pitch of the blades will remain fixed.

When pulley 28 is swung in one direction, as shown in Fig. 2, the radius of the contact line on driving face 23 is increased, the radius of the contact line on pulley-face is decreased, the radius of contact line on pulley-face 30 is increased, and the radius of contact line on driven face 27 of element 21 is decreased. This will cause the pulley 28 to rotate the driven element 24 and eccentric 41 in, and relatively to the hub, in the direction of rotation of the propeller so that the eccentric gear-ring $h$ will be rotated within gear-ring $e$ and advance the gear-ring $d$ in the hub and in the direction of rotation of the hub or rotate the ring $d$ faster than the hub. This will rotate segments $c^5$ to increase the pitch of the blades.

When the pulley 28 is tilted in the opposite direction, as indicated in Fig. 2$^a$, the radius of the contact line on driving face 23 will be decreased, the radius of the contact line on pulley-face 29 will be increased, the radius of the contact line on pulley-face 30 will be decreased, and the radius of the contact line on the face 27 of driven element 24 will be increased. In this position of pulley 28, element 24 and eccentric 41 will be rotated in and relatively to the hub $b$ in the direction opposite to the rotation of the propeller. This will cause the gear-ring $d$ to be rotated by eccentric 41 at a lower speed than the hub $b$. The rolling movement of the gear-ring $h$ in the gear-ring $e$ which is fixed to the hub will then effect, through gear teeth $h^3$ and gear-teeth $d^1$ on ring $d$, rotation of segments $c^5$ to decrease the pitch of the blades.

Friction-pulley 28 is journaled on a ball-bearing 42 which is carried by a hub 43. Said hub is supported by a universal or ball-and-socket joint 45 between said hub and a stud 46 which is fixed to the cross-member of a yoke 44. This universal joint permits pulley 28, when the yoke is shifted, to vary its angular relation with the convex friction faces 23, 27 of elements 20, 24. Yoke 44 is pivotally supported on coaxial pintles 48 to swing transversely of the pulley 28. When the yoke 44 is swung in either direction, the axis of the joint 45 will be shifted longitudinally of shaft $a$ and the angular relation between the friction faces on pulley 28 and the convex friction faces 23, 27 will be varied to vary the radii of the contact lines between said faces for varying the speed of rotation of element 24 and eccentric 41 in the hub. The outer portion of the pulley remains confined between elements 20, 24 while its axis is shifted by stud 46. The faces 23, 27 are outwardly divergent and the pulley-faces are convergent. The universal joint 45 and the engaging portions of the friction faces of the pulley 28 and friction faces 23, 27 control the angular position of the pulley. The yoke 44 is pivoted so it will swing the joint 45 longitudinally of shaft $a$ to vary the radial lengths of the lines of contact between the friction faces of the pulley and elements 20, 24 for speed increase or decrease as hereinbefore described, and to keep both faces of pulley 28 in operative contact with faces 23, 27, respectively.

Fluid pressure mechanism may be used to shift yoke 44 to control the angular settings of pulley 28 for variably operating the pitch-change gearing. This mechanism comprises a cylinder 61 integrally formed with a head 52 with a piston 62, a stem 63 pivoted at 44$^1$ to yoke 44 and held by a spring 64 in thrust-engagement with said stem. Spring 64 is interposed between a flange on the inner end of stem 63 and a cap 64$a$ which is fixed to head 52.

Fluid under pressure, usually oil, is supplied to cylinder 61 through a port 66 in casing $a^2$ which communicates with a port 67 in housing 53, and a pipe 68 which leads from port 67 to a duct 69 and extends around the chamber in housing 33. Duct 69 communicates with cylinder 61 to operate piston 62.

The pressure in the oil line leading to cylinder 61 may be controlled in any suitable manner, as well understood in the art, so that the pressure of the fluid in the cylinder, will hold yoke 44 in position to retain the pulley 28 in its neutral position against the force of spring 64; upon an increase of pressure will shift the yoke to the position shown in Fig. 2 for increasing the pitch of the blades, or upon reduction of the pressure, the spring 64 will shift yoke 44 and pulley 28 into the position shown in Fig. 2$^a$ to decrease the pitch of the blades.

The drive-pulley 28 and the portion of elements 20, 24 engaged thereby and the means for shifting pulley 28 are disposed around the portion $b^4$ of hub $b$ and between the hub-portion $b^7$ which surrounds gear-rings $d$, $e$ and the casing or wall $a^2$ and are enclosed by an intermediate housing 53 which is secured to casing $a^2$ and carries a sealing ring 60 which engages an axial flange on the head $e^4$ which is angular in cross-section and fixed to the inner end of portion $b^7$ of hub $b$.

Studs 50 are fixedly secured in supporting arms 51. The controlling element for shifting yoke 44 comprises a yoke 54 which is fixedly clamped to the eccentrics or short arms 49. When yoke 54 is swung on studs 50 as an axis, the pintles 48, to which the ball bearing yoke 44 is pivoted, the inner pivoted end of the yoke will swing to and from the axis of the driving and driven elements 20, 24 while permitting the yoke 44 to rock on pintles 48 and in the socket of the universal joint 45 and the conoidal faces of pulley 28 to adjust themselves for the varying contact with the faces 23, 27 on different radii. The angle of the yoke 44, universal joint 45, hub 43 and pulley 28 when the yoke 45 is rocked, controls the speed and also shifts its axis slightly to and from the driving and driven elements to provide for proper contact on different radii between the pulley faces and the driving and driven elements as hereinafter described.

In order to provide for effective frictional contact or loaded engagement between the pulley 28 and the friction surfaces 23, 27 in all positions of the pulley, devices are provided for pressing the pintles 48, on which the yoke 44 is pivoted, toward the axis of the propeller shaft $a$. This means comprises a yoke 54 which straddles yoke 44 and is clamped to a pair of coaxial pivot-members 49 which carry the pivot-pins 48 for the shifter-yoke 44 and are pivotally mounted on studs 54$^a$ which are offset from or eccentric to pivot-pins 48 for yoke 44. Studs 54$^a$ are fixedly held in supporting arms 51 on head 52. A second cylinder 70 with a piston 71 is provided in head 52. A spring 73 is interposed between piston 71 and yoke 54. Oil under pressure corresponding to the pressure in cylinder 61 flows to the closed end of cylinder 70 from duct 69 which supplies oil to cylinder 61. A stop-ring 72 limits the outward movement of piston 71. The spring 73 and the fluid pressure in cylinder 70 apply yielding pressure to the yoke 54 which is clamped to the pivot-members 49 to rock said members around fixed pivots 54$^a$ and move pivot-pins 48 toward the axis of propeller-shaft $a$, so that the friction-faces 28, 29 of pulley 28 will be spring-loaded or yieldingly forced into engagement with friction-surfaces 23, 27 to insure the maintenance of driving contact between the pulley and said surfaces in all angular settings of the pulley. Spring 73 is sufficient, under variations of pressure in cylinder 61, to exert sufficient yielding pressure on yoke 54 to force pulley 28 against surfaces 23, 27. Oil is circulated through the chamber in the hub between hub-portions $b^5$ and $b^7$ which contain the pitch-change gearing and the chamber in housing 53 which surrounds the elements 20, 24 and the pulley 28, by any suitable means, as well understood in the art, to lubricate said gearing.

Pulley 28 and its mounting, including yoke 44, its operating mechanism, including cylinder 61, piston 62, stem 63, and spring 64, are mounted on head 52 which is secured to the intermediate housing 53 to permit the unitary removal of all of the parts carried by said head for inspection or repair. The head closes the opening in the housing 53 through which said parts are insertable or removable.

A pin 80 is screw-threaded into head 52 and is provided with stops 81 for limiting the movement of the yoke 44. The outer end of said pin is splined to a cap 82 which is rotatably mounted in the front-wall of housing 53. By rotating the cap, the pin can be adjusted to vary the limit of angular movement of pulley 28 relatively to the elements 20, 24.

In operation, the pressure of the fluid supplied to cylinder 61, when the propeller-blades are set at the desired pitch, will be such that piston 62 and yoke 44 will be set to retain the pulley 28 in its neutral position between the driving and driven elements 20, 24. This will cause the radii of the contacting lines of the pulley and friction-faces 23, 27, respectively, to be the same so that the elements will rotate together with the hub and at the same speed and the pitch-changing gearing will remain fixed. When an increase of pitch is desired, the pressure of the fluid in cylinder 61 will be increased to shift pulley 28 into position shown in Fig. 2. Driven element 24 and eccentric 41 will then be rotated in, and relatively to, the hub, to operate the bevelled gear-ring $d$ to increase the pitch of the blades. When the pitch has been increased to the desired limit, pulley 28 will be restored to its neutral position by the reduction of pressure of the fluid in cylinder 61. When a pitch-decrease is desired, the pressure of fluid in cylinder 61 will be further reduced and pulley 28 will be shifted in the position shown in Fig. 2$^a$. Driven element 24 and eccentric 41 will then be rotated in the propeller-hub in the direction of rotation of the propeller but at a lower speed, to rotate ring $d$ so it will decrease the pitch of the blades. When the pulley 28 is set to increase the pitch of the blades, it will rotate the eccentric in the hub in the direction of rotation of the propeller and, as a result, the speed of the eccentric will be greater than the hub.

The invention exemplifies: improved pitch-change mechanism which comprises an eccentric rotatable relatively to the propeller-hub and gear-rings fixed and rotatable in the hub, respectively, for increasing or decreasing the pitch of the blades; simple, friction-driven gearing with an angularly adjustable double-face friction-pulley for increasing or decreasing the speed of rotation of the eccentric in, or relatively to, the propeller hub; simple gearing, by which a very high ratio speed-reduction from the propeller-hub or shaft is utilized for operating the speed-change gearing; a gearing which includes an eccentric gear-ring which remains in constant mesh with gear-rings which are fixed and rotatable in the hub, respectively, to dispense with the necessity of coupling or uncoupling the pitch-change gearing or sliding the eccentric longitudinally, and a friction-pulley which remains in constant engagement with the driving and driven friction-faces and is angularly adjustable to effect speed-changes without clutches for coupling and uncoupling the gearing.

The invention is not to be understood as restricted to the details set forth, since these may be modified within the scope of the appended claims, without departing from the spirit and scope of the invention.

Having thus described the invention, what we claim as new and desire to secure by Letters Patent is:

1. In a controllable pitch propeller, the combination with a shaft, a hub rotatable by the shaft and propeller blades rotatably mounted in the hub for pitch variation, of a driving element around and fixed to the shaft, a driven element around and rotatable relatively to the shaft, said elements having confronting friction faces on their sides, gearing operable by said driven element for rotating the blade for pitch-variation, an idler pulley having friction faces on opposite sides thereof between, and for respectively engaging, the confronting friction faces of said element and angularly movable to engage relatively different radii of its faces with the confronting faces of the elements on relatively different radii of the elements for driving the driven element at different speeds to operate the gearing for pitch-variation, and means for shifting the pulley angularly to drive the driven element at different speeds for pitch-variation and for pressing the pulley angularly to force its opposite faces into engagement with the confronting faces of the elements, respectively.

2. In a controllable pitch propeller, the combination with a shaft, a hub rotatable by the shaft and propeller blades rotatably mounted in the hub for pitch-variation, of a driving element around and fixed to the shaft, a driven element around and rotatable relatively to the shaft, said elements having confronting convex outwardly divergent friction faces on their sides, gearing operable by said driven element for rotating the blades for pitch-variation, an idler pulley having outwardly convergent friction faces on opposite sides thereof between, and for respectively engaging, the confronting friction faces of said element and angularly movable to engage relatively different radii of its faces with the confronting faces of the elements on relatively different radii of the elements for driving the driven element at different speeds to operate the gearing for pitch-variation, and means for shifting the pulley angularly to drive the driven element at different speeds for pitch-variation, and for pressing the pulley angularly to force its opposite faces into engagement with the confronting faces of the elements, respectively.

3. The combination with a shaft, a hub rotatable with the shaft and propeller blades rotatably mounted in the hub for pitch variation, of pitch-changing mechanism comprising a pair of coaxial relatively rotatable friction elements having confronting divergent friction faces, and a pulley provided on its opposite sides with friction faces, outwardly convergent relatively to each other, each face being adapted to engage only one of the elements, the pulley being supported to rotate on an axis substantially parallel with the axis of the friction elements to respectively engage its opposite faces with the faces on the friction elements on an equal radius and for angular movement to engage its opposite faces with the elements, respectively, on relatively different radii for driving one of the elements from the other at different relative speeds, and means for shifting the pulley to control the pitch-changes.

4. The combination with a shaft, a hub rotatable with the shaft and propeller blades rotatably mounted in the hub for pitch-variation, of pitch-changing mechanism comprising a pair of coaxial relatively rotatable friction elements having confronting divergent convex friction faces, and a pulley provided on its opposite sides with friction faces, outwardly convergent relatively to each other, each face being adapted to engage only one of the elements, the pulley being supported to rotate on an axis substantially parallel with the axis of the friction elements to respectively engage its opposite faces with the faces on the friction elements on an equal radius and for angular movements to engage its opposite faces with the elements, respectively, on relatively different radii for driving one of the elements from the other at different relative speeds, and means for shifting the pulley to control the pitch-changes.

5. The combination with a shaft, a hub rotatable with the shaft and propeller blades rotatably mounted in the hub for pitch-variation, of pitch-changing mechanism comprising a pair of coaxial relatively rotatable friction elements having confronting divergent friction faces, and an idler pulley provided on its opposite sides with friction faces, outwardly convergent relatively to each other, each face being adapted to engage only one of the elements, a bearing at the longitudinal center of the pulley on which the pulley is supported for universal pivotal movement, to rotate on an axis substantially parallel with the axis of the friction elements to respectively engage its opposite faces with the faces on the friction elements on an equal radius, and for angular movement to engage its opposite faces with the elements, respectively, on relatively different radii for driving one of the elements from the other at different relative speeds, and means for shifting the bearing to shift the pulley and control the pitch-changes.

6. The combination with a shaft, a hub rotatable with the shaft and propeller blades rotatably mounted in the hub for pitch-variation, of pitch-changing mechanism comprising a pair of coaxial relatively rotatable friction elements having confronting divergent friction faces, and a pulley provided on its opposite sides with friction faces, outwardly convergent relatively to each other, each face being adapted to engage only one of the elements, an arm on which the pulley is pivotally supported, a pivoted support for the arm on which the arm is eccentrically pivoted, the pulley being rotatable on an axis substantially parallel with the axis of the friction elements to respectively engage its opposite faces with the faces on the friction elements on an equal radius and for angular movement to engage its opposite faces with the elements, respectively, on relatively different radii for driving one of the elements from the other at different relative speeds, and means for shifting the pivoted support to shift the pulley and control the pitch-changes.

7. The combination with a shaft, a hub rotatable with the shaft and propeller blades rotatably mounted in the hub for pitch variation, of pitch-changing mechanism comprising a pair of coaxial relatively rotatable friction elements having confronting divergent friction faces, and a pulley provided on its opposite sides with friction faces, outwardly convergent relatively to each other, each face being adapted to engage only one of the elements, the pulley being supported to rotate on an axis substantially parallel with the axis of the friction elements to respectively engage its opposite faces with the faces on the friction elements on an equal radius and for angular movement to engage its opposite faces with the elements, respectively, on relatively different radii for driving one of the elements from the other at different relative speeds, means for shifting the pulley to control the pitch-changes, and means for yieldingly pressing the pulley toward the axis of the elements.

8. The combination with a shaft, a hub rotatable with the shaft and propeller blades rotatably mounted in the hub for pitch-variation, of pitch-changing mechanism comprising a pair of coaxial relatively rotatable friction elements having confronting divergent friction faces, an eccentric rotatable with one of said elements, gearing operable by the eccentric for rotating the blades in the hub, and a pulley provided on its opposite sides with friction faces, outwardly convergent relatively to each other, each face being adapted to engage only one of the elements, the pulley being supported to rotate on an axis substantially parallel with the axis of the friction elements to respectively engage its opposite faces with the faces on the friction elements on an equal radius and for angular movement to engage its opposite faces with the elements, respectively, on relatively different radii for driving one of the elements from the other at different relative speeds, and means for shifting the pulley to control the pitch-changes.

9. The combination with a shaft, a hub rotatable with the shaft and propeller blades rotatably mounted in the hub for pitch-variation, of pitch-changing mechanism comprising a pair of coaxial relatively rotatable friction elements having confronting divergent friction faces, and a pulley provided on its opposite sides with friction faces, outwardly convergent relatively to each other, each face being adapted to engage only one of the elements, the pulley being supported to rotate on an axis substantially parallel with the axis of the friction elements to respectively engage its opposite faces with the faces on the friction elements on an equal radius and for angular movement to engage its opposite faces with the elements, respectively, on relatively different radii for driving one of the elements from the other at different relative speeds, means for shifting the pulley to control the pitch-changes, and a stationary housing for said elements and pulley comprising a removable section on which the pulley and its shifting means are mounted.

10. The combination with a shaft, a hub rotatable with the shaft and propeller blades rotatably mounted in the hub for pitch variation, of pitch-changing mechanism comprising a pair of coaxial relatively rotatable friction elements having confronting convex divergent friction faces, and a pulley provided on its opposite sides with outwardly facing conical friction faces, each face being adapted to engage only one of the elements, the pulley being supported to rotate on an axis substantially parallel with the axis of the friction elements to respectively engage its opposite faces with the faces on the friction elements on an equal radius and for angular movement to engage its opposite faces with the elements, respectively, on relatively different radii for driving one of the elements from the other at different relative speeds, and means for shifting the pulley to control the pitch-changes.

11. The combination with a shaft, a hub rotatable with the shaft and propeller blades rotatably mounted in the hub for pitch-variation, of mechanism for effecting pitch-changes of the blades comprising a pair of relatively rotatable friction elements around and coaxial with the shaft and having confronting divergent friction faces, one of said elements being driven by the shaft and a pulley between said elements having, on its opposite sides, outwardly facing conical side faces each engaging only one of the elements, said pulley being normally supported to rotate on an axis parallel to the axis of the shaft and angularly movable with respect to the axis of said elements to vary the radii of the contacting line between the pulley and the elements, for driving one of the elements from the other at different relative speeds, and means for shifting the pulley angularly relatively to its normal axis to control the pitch-changes.

12. The combination with a shaft, a hub rotatable with the shaft and propeller blades rotatably mounted in the hub for pitch-variation, of mechanism for effecting pitch-changes of the blades comprising a pair of relatively rotatable friction elements around and coaxial with the shaft and having convex confronting divergent friction faces, one of said elements being driven by the shaft and a pulley between said elements having outwardly facing conical side faces each engaging only one of the elements, said pulley being normally supported to rotate on an axis parallel to the axis of the shaft and angularly movable with respect to the axis of said elements to vary the radii of the contacting line between the pulley and the elements for driving one of the elements from the other at different relative speeds, and means for shifting the pulley angularly relatively to its normal axis to control the pitch-changes.

GLEN T. LAMPTON.
PAUL F. HACKETHAL.
ARTHUR T. BRIGGS.